(12) United States Patent
Karadia

(10) Patent No.: US 7,029,390 B2
(45) Date of Patent: Apr. 18, 2006

(54) AIR VENT FOR VEHICLE AIR DUCTING

(75) Inventor: Narendra Karadia, Leicester (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/791,065

(22) Filed: Mar. 2, 2004

(65) Prior Publication Data
US 2004/0219874 A1 Nov. 4, 2004

(30) Foreign Application Priority Data
Mar. 3, 2003 (GB) .................................. 0304791

(51) Int. Cl.
*B60H 1/34* (2006.01)
(52) U.S. Cl. ...................... 454/155; 454/152
(58) Field of Classification Search ................ 454/152, 454/155, 322, 325, 326, 327
See application file for complete search history.

(56) References Cited

U.S. PATENT DOCUMENTS 5,350,555 A 9/1994 Tsuda et al.

6,780,098 B1 * 8/2004 Nishida et al. ............. 454/155
2003/0050001 A1 * 3/2003 Kamio ....................... 454/155

FOREIGN PATENT DOCUMENTS

| DE | 39 27 217 | 8/1990 |
| DE | 202 00 605 | 6/2002 |
| DE | 202 03 852 | 8/2002 |
| EP | 0 347 651 | * 12/1989 |
| GB | 2 100 418 | * 12/1982 |
| GB | 2 231 652 | 11/1990 |
| WO | WO 98/29272 | 7/1998 |

* cited by examiner

*Primary Examiner*—Harold Joyce
(74) *Attorney, Agent, or Firm*—Gigette M. Bejin; Artz & Artz, P.C.

(57) ABSTRACT

An air vent 10 for a vehicle air ventilation system and which comprises a housing 11 having an air inlet 12 and an air outlet 13, an air flow control valve 15 located in the inlet 12, and a screen 17 comprising a plurality of slats 18–21 located in the outlet 13. The slats are moveable by a control wheel 28 from a closed condition, in which air flow through the outlet 13 is impeded, to an open condition allowing air flow through the outlet 13, the control wheel 28 also operating the valve 15 to permit the flow of air prior to opening the slats, the air flow passing through slots 22 in at least some of the slats.

10 Claims, 4 Drawing Sheets

AIR VENT FOR VEHICLE AIR DUCTING

CROSS REFERENCE TO RELATED APPLICATIONS

This patent application claims priority from the GB patent application no. 0304791.7, filed on Mar. 3, 2003.

1. Field of Invention

This invention relates to air vents which are used with the air ducting and ventilation systems for vehicle interiors, and which are typically but not exclusively installed in the vehicle dashboard.

2. Background of Invention

Air vents or nozzles are typically provided in the dashboards of motor vehicles to control the supply of air from a vehicle air ventilation and/or air conditioning system into the passenger compartment of a vehicle. An air vent is therefore required to have some aesthetic properties and when closed should be visually unobtrusive and fit harmoniously with the interior trim of the vehicle.

A typical air vent, for example as shown in U.S. Pat. No. 6,244,952 or GB 2351145, has a housing having an air flow control valve at its air inlet port with vanes or ribs at the air outlet. The vanes or ribs may be moved relative to the housing and used to direct the air flow from the vent, and in some cases the directional vanes may be closed completely on each other to present an aesthetically pleasing closed surface when the vent is not in use. In U.S. Pat. No. 6,244,952, the directional vanes are hidden by a roller blind or screen which hides the outlet when the vent is not in use. The screen must be removed to permit any air flow through the vent and is displaced by an electric motor switched on by a control wheel which also operates the air flow control valve either mechanically or through the electric motor.

A disadvantage of the system is that it requires displacement of the screen to permit air flow through the vent and that the air vent is operated through expensive electrical controls and motors.

The present invention provides an air vent for a vehicle air ventilation system having the directional vanes hidden behind a screen and which does not require any displacement of the screen to permit air flow, and an air vent in which the volume of air flow control and screen opening mechanism are operated through a single mechanical control.

According to the present invention there is provided an air vent for a vehicle air ventilation system comprising an air inlet, an air outlet and a screen located at the air outlet, the screen being moveable from a closed condition in which air flow through the outlet is impeded to an open condition allowing air flow through the outlet, characterised by at least one aperture in the screen permitting some air flow through the screen when the screen is in its closed condition.

Preferably, the screen comprises a plurality of slats. In the closed condition, each slat is in contact with, or very close proximity to, an adjacent slat. A plurality of the slats are provided with apertures such that with the screen in the closed condition air can flow through the apertures.

The slats may be individually rotatable, the screen being opened by individual rotation of each slat.

Vanes for directional control of the air flow may be mounted at the air outlet behind the screen.

Preferably, an air flow control valve is located at the air inlet.

Suitably, a control actuator is located at the air outlet, the control actuator being coupled to the air flow control valve and screen, so that after a predetermined movement of the control actuator, further movement causes movement of the screen from a closed to an open condition. The connection between the control actuator and screen includes a lost motion connection.

The air flow control valve may comprise a flap valve pivotally mounted at the air inlet for rotation between open and closed positions, the flap being rotated by a lever, the lever being coupled by a pivotal link to the control actuator so that movement of the control actuator causes rotation of the valve.

According to another aspect of the present invention, there is provided an air vent for a vehicle air ventilation system, the air vent comprising an air inlet and an air outlet, an air flow control valve located at the air inlet, and a screen located at the air outlet, the screen having at least one aperture therein and being moveable from a closed condition in which air flow through the air outlet is impeded to an open condition allowing air flow through the air outlet, wherein a control actuator is coupled to the air flow control valve so that movement of the control actuator operates the air flow control valve, the control actuator being further coupled to the screen so that the screen is caused to move from a closed condition to an open condition only after a predetermined movement of the control actuator.

BRIEF DESCRIPTION OF THE DRAWINGS

The invention will be described by way of example and with reference to the following drawings in which.

DETAILED DESCRIPTION OF THE PREFERRED EMBODIMENT

Figure 1:
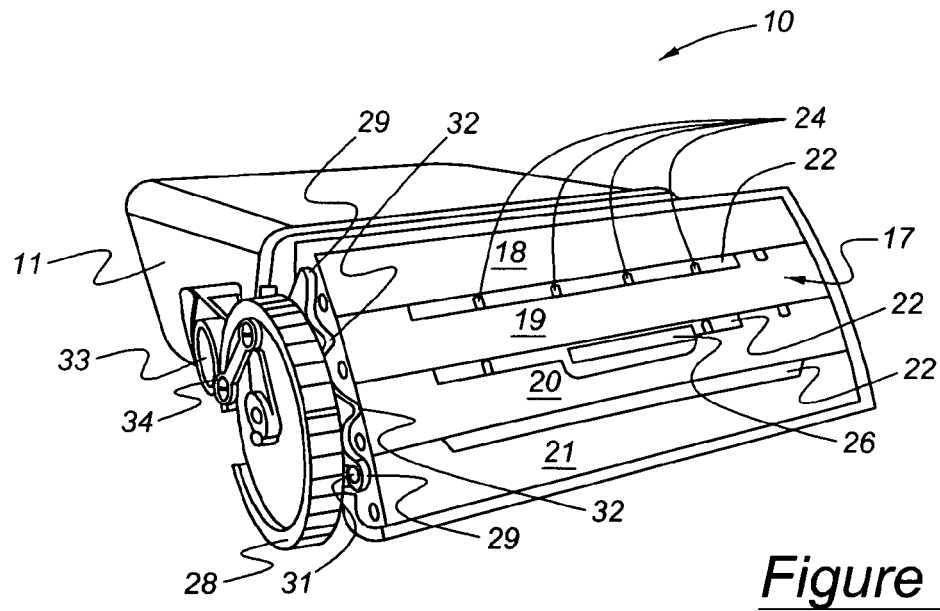
FIG. 1 is an isometric view of an air vent according to the present invention.
Figure 2:
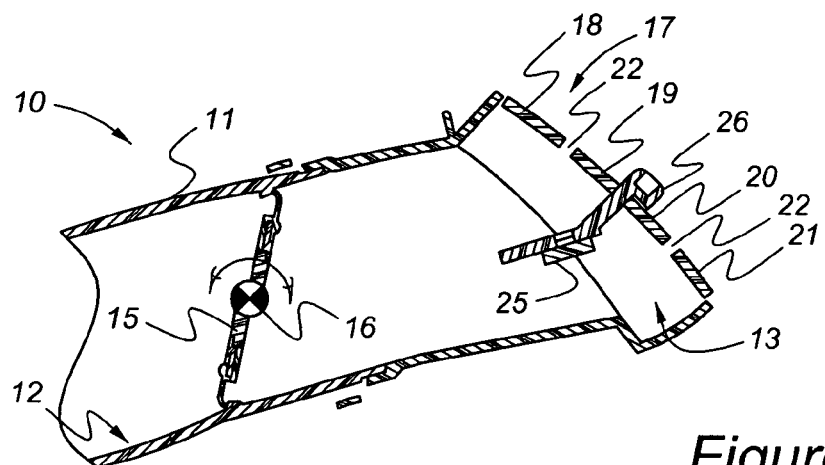
FIG. 2 is a longitudinal section through the air vent shown in FIG. 1 in a closed condition.

With reference to FIGS. 1 & 2, there is shown an air vent 10 for use in the dashboard of a motor vehicle. The air vent has a hollow housing 11 having an inlet 12 connectable to a vehicle air ventilation and/or air conditioning system and an outlet 13 through which air enters the vehicle passenger compartment.

An air flow control valve 15 is located at the inlet 12 to control the volume flow of air into the vent 10 and is pivoted to the housing 11 about an axis 16 at its centre, so that the valve can rotate relative to the inlet 12. The valve in the position shown in FIG. 2 completely closes the vent 10. A screen 17 is located in the inner end of the outlet 13, that is inner with respect to the vehicle. The screen 17 comprises a plurality of substantially parallel slats 18–21 that extend horizontally across the mouth of the outlet 13 and are vertically orientated. The slats 18–21 are substantially planar and are arranged so that the adjacent edges of neighbouring slats are almost in contact with, or are in close proximity to, each other. The upper edges of the slats 19–21 are provided with elongate apertures or slots 22 which extend along a mid portion of the upper edges of the respective slats.

Immediately behind the screen 17, there is located a grille of substantially vertical vanes 24 linked by a central bar 25 having a slide knob 26 attached thereto. The vanes 24 are pivotally mounted in the outlet 13 and can be moved by use of the knob 26 to control the direction of the air out flow from the vent.

Figure 4:
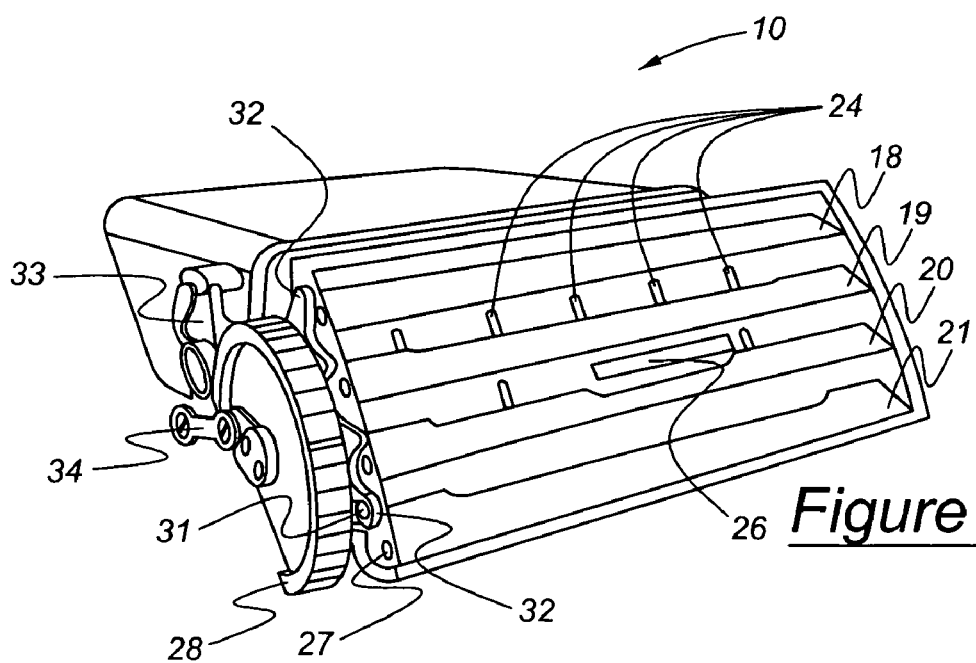
FIG. 4 is an isometric view of the air vent in an open condition.
Figure 6:
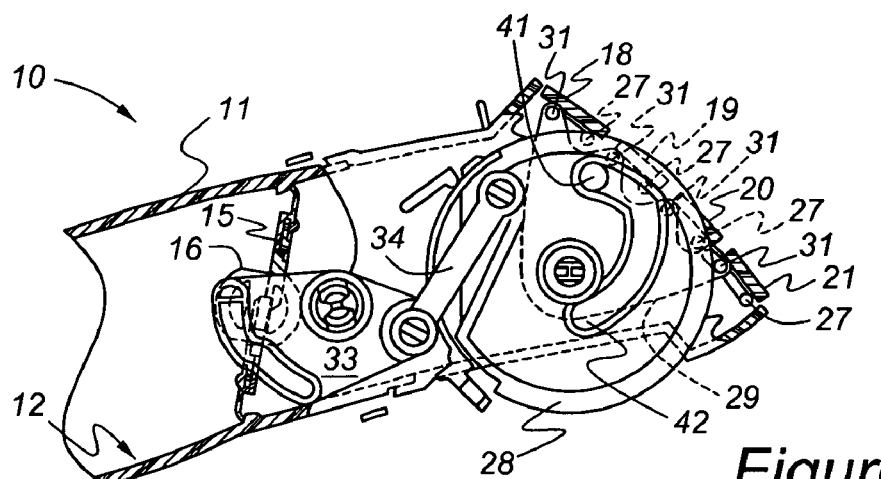
Figure 7:
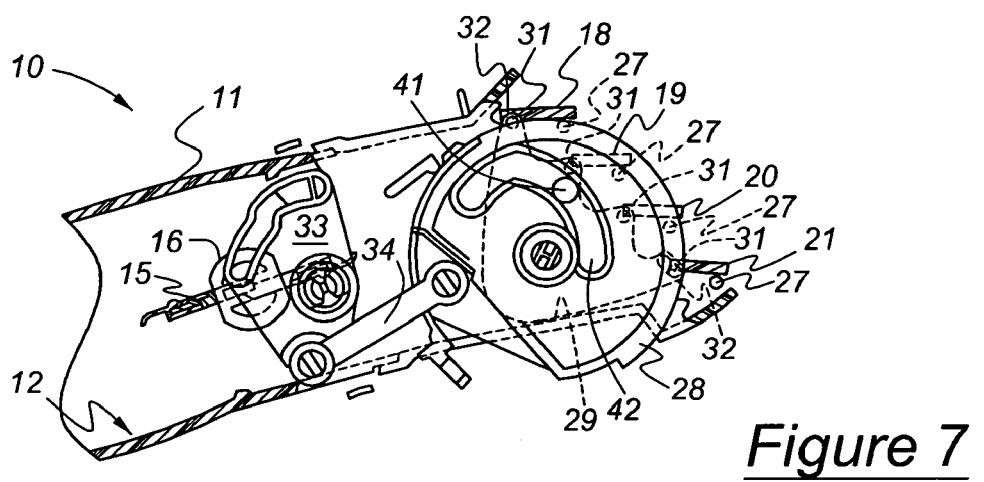
FIG. 7 is a section through the operating mechanism of FIG. 6 in the open condition.

As is best seen in FIGS. 4, 6 & 7, the slats 18–21 are each pivoted to the mouth of the housing by pins 27 at their respective lower edges. A control actuator comprising a wheel 28 is mounted vertically on the outside of and adjacent the housing 11, and is coupled by arm 29 to respective pins 31 at the top edge of each slat. The arm 29 is rotatable relative to the wheel and housing coaxially of the wheel axis and has four lobes 32 each of which is connected to a pin 31 at the top edge of each slat. There is a lost motion connection between the arm 29 and control wheel 28 so that the control wheel 28 can rotate for a predetermined amount without movement of the slats 18–21. The lost motion connection may, for example, be provided by a pin 41 on the arm 29 engaging an elongate aperture 42 in the control wheel. Any further rotational movement beyond the predetermined degree of rotation will cause the slats to move about the axis of the pins 27.

The control valve 15 may comprise a flap or disc, and the axis 16 may comprise a spindle which extends across the full width of the housing, or may comprise separate stub spindles located one on each side of the flap. The spindle 16 extends through the housing and is rotationally fast with a lever 33 pivotally mounted externally of the housing. The lever 33 is in turn coupled to the control wheel 28 by a link 34 which is pivoted to one end of the lever 33 and a radially outer portion of the control wheel. Rotation of the control wheel 28 causes the lever 33 to move to rotate the valve 15 about the spindle 16.

Figure 3:
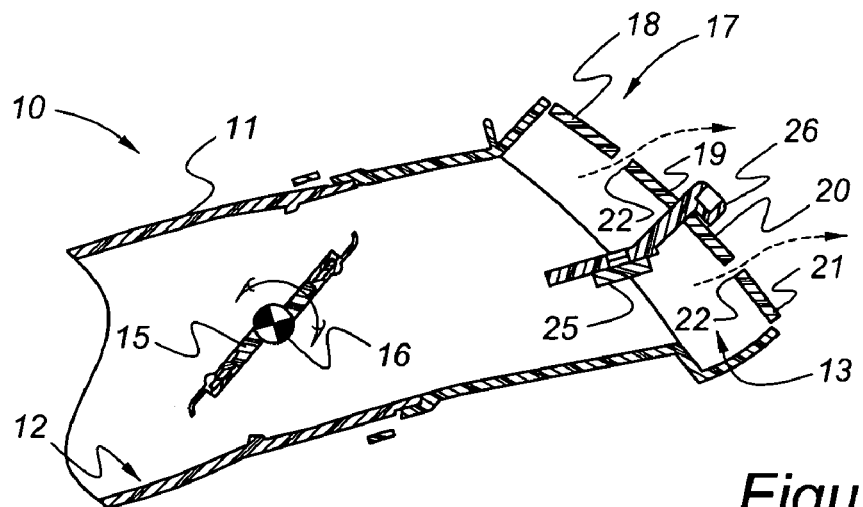
FIG. 3 is a longitudinal section as shown in FIG. 1 with the air vent in an impeded partial flow condition.

The vent 10 is shown in a closed condition in FIG. 2 and FIG. 6. The control wheel 28 is rotated within said predetermined limit and partially opens the valve 15 through rotation of the lever 33 via the link 34. The arm 29 remains stationary and the pin 41 moves along the aperture 42 whilst the slats 18–21 remain closed. This is shown in FIG. 3, and air entering the vent 10 exits the outlet 13 through the slots 22 in the upper edges of the slats 19–21, thus providing an impeded air flow which may be perceived by a passenger as a gentle soft breeze.

Figure 5:
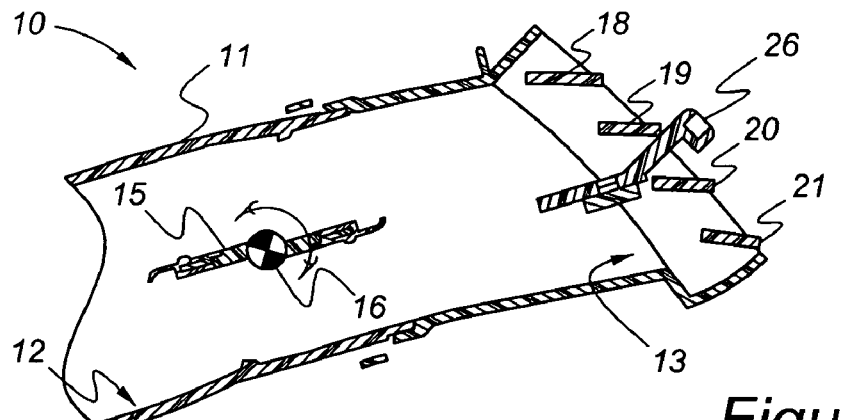
FIG. 5 is a longitudinal section through the air vent in an open condition, FIG. 6. is a section through the control air flow valve and slat operating mechanism in the closed condition.

Further rotational movement of the control wheel 28 in the same direction beyond the predetermined limit causes further opening of the valve 15 and rotational movement of the arm 29 causing the slats 18–21 to move around the pins 27. The top edges of the slats 18–21 are moved inwardly by the arms 29 causing the slats to rotate clockwise opening large gaps as the planar slats move from a substantially vertical orientation to a substantially horizontal orientation. This is shown in FIGS. 4 and 5. In this condition the air vent 10 is fully open and the vanes 24 may be used to direct the air flow as is required by the passenger or driver of the vehicle.

What is claimed is:

1. An air vent for a vehicle air ventilation system comprising: an air inlet; an air outlet; a screen located at the air outlet, the screen being moveable from a closed condition in which air flow through the outlet is impeded to an open condition allowing air flow through the outlet, with said screen having at least one aperture permitting some air flow through the screen when the screen is in its closed condition; an air flow control valve located at the air inlet; and, a control actuator located at the air outlet, the control actuator being coupled to the air flow control valve and screen so that after a predetermined movement of the control actuator, further movement causes movement of the screen from a closed to an open condition.

2. The air vent according to claim 1, wherein the screen comprises a plurality of slats.

3. The air vent according to claim 2, wherein in the closed condition the edge of each slat is in contact with, or close proximity to, the edge of an adjacent slat.

4. The air vent according to claim 3, wherein a plurality of the slats are provided with apertures such that with the screen in the closed condition air can flow through the apertures.

5. The air vent according to claim 2, wherein the slats are individually rotatably mounted and the screen is opened by individual rotation of the slats.

6. The air vent according to claim 1, wherein the control actuator is coupled to the screen through a lost motion connection.

7. The air vent according to claim 1, wherein the air flow control valve comprises a flap valve pivotally mounted at the air inlet for rotation between open and closed positions, the flap being rotated through a lever.

8. The air vent according to claim 7, wherein the lever is coupled by a pivotal link to the control actuator so that movement of the control actuator causes rotation of the flap valve.

9. The air vent according to claim 1, further comprising vanes for directional control of the air flow, the vanes being mounted at the air outlet behind the screen.

10. An air vent for a vehicle air ventilation system, the air vent comprising an air inlet and an air outlet, an air flow control valve located at the air inlet, and a screen located at the air outlet, the screen having at least one aperture therein and being moveable from a closed condition in which air flow through the air outlet is impeded to an open condition allowing air flow through the air outlet, wherein a control actuator is coupled to the air flow control valve so that movement of the control actuator operates the air flow control valve, the control actuator being further coupled to the screen so that the screen is caused to move from a closed condition to an open condition only after a predetermined movement of the control actuator.

* * * * *